United States Patent
Feri et al.

(10) Patent No.: US 9,386,643 B2
(45) Date of Patent: Jul. 5, 2016

(54) VISIBLE LIGHT COMMUNICATIONS USING A REMOTE CONTROL

(71) Applicant: KONINKLIJKE PHILIPS N.V., Eindhoven (NL)

(72) Inventors: Lorenzo Feri, Eindhoven (NL); Stephanus Joseph Johannes Nijssen, Eindhoven (NL); Constant Paul Marie Jozef Baggen, Blerick (NL); Tommaso Gritti, Breda (NL); Ruben Rajagopalan, Neuss (DE); Frederik Jan De Bruijn, Eindhoven (NL); Hongming Yang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 17 days.

(21) Appl. No.: 14/372,523

(22) PCT Filed: Jan. 14, 2013

(86) PCT No.: PCT/IB2013/050324
§ 371 (c)(1),
(2) Date: Jul. 16, 2014

(87) PCT Pub. No.: WO2013/108166
PCT Pub. Date: Jul. 25, 2013

(65) Prior Publication Data
US 2014/0375217 A1   Dec. 25, 2014

Related U.S. Application Data

(60) Provisional application No. 61/587,298, filed on Jan. 17, 2012, provisional application No. 61/599,459, filed on Feb. 16, 2012.

(51) Int. Cl.
*H05B 37/02* (2006.01)
*H05B 33/08* (2006.01)
*H04B 10/116* (2013.01)

(52) U.S. Cl.
CPC .......... *H05B 33/0821* (2013.01); *H04B 10/116* (2013.01); *H05B 37/0272* (2013.01)

(58) Field of Classification Search
USPC ................... 315/129, 130, 291, 297, 307, 308
See application file for complete search history.

(56) References Cited

U.S. PATENT DOCUMENTS

| | | |
|---|---|---|
| 2006/0056855 A1 | 3/2006 | Nakagawa |
| 2008/0024633 A1 | 1/2008 | Hofer |

(Continued)

FOREIGN PATENT DOCUMENTS

| | | |
|---|---|---|
| EP | 2503852 A1 | 9/2012 |
| WO | WO2006111930 A2 | 10/2006 |

(Continued)

OTHER PUBLICATIONS

Veeraraghavan, Ashok, et al, "Coded Strobing Photography: Compressive Sensing of High Speed Periodic Videos," IEEE Transactions on Pattern Analysis and Machine Intelligence Nov. 2011 (16 Pages).

*Primary Examiner* — Douglas W Owens
*Assistant Examiner* — Jianzi Chen
(74) *Attorney, Agent, or Firm* — Meenakshy Chakravorty (57) ABSTRACT

According to one aspect of the disclosure, a lighting system comprises a remote control unit (4) and at least one lighting device (2a, 2b, 2c) comprising a light driver (13) and a light emitter (14). The remote control unit (4) comprises an image capturing unit (5) and is arranged to control the lighting device (2a, 2b, 2c). To do so, the remote control unit (4) receives information relating to current/present settings of the image capturing unit (5), then determines one or more properties of signals for visible light communications based on these settings. The one or more properties are then communicated to the at least one lighting device (2a, 2b, 2c). Upon reception thereof the light driver (13) generates a light emitting control signal based on the received properties and visible light communications based on the light emitting control signal is emitted by the light emitter (14). According to another aspect, a lighting device (2a, 2b, 2c) adapts emitted modulated light and adapts the modulation so as not to correspond to blind-spots of an image capture unit (5).

21 Claims, 5 Drawing Sheets

(56) References Cited

U.S. PATENT DOCUMENTS

2010/0295457 A1   11/2010   Lu
2013/0141555 A1*  6/2013   Ganick .................... G01S 1/70
                                                              348/61

FOREIGN PATENT DOCUMENTS

| WO | WO2010116299 A1 | 10/2010 |
| WO | WO2011001392 A2 | 1/2011 |
| WO | WO2011086517 A1 | 7/2011 |

* cited by examiner

VISIBLE LIGHT COMMUNICATIONS USING A REMOTE CONTROL

CROSS-REFERENCE TO PRIOR APPLICATIONS

This application is a U.S. national stage application under 35 U.S.C. §371 of International Application No. PCT/IB2013/050324, filed on Jan. 14, 2013, which claims priority benefit under 35 U.S.C. §119(e) of U.S. Provisional Application No. 61/587,298 filed on Jan. 17, 2012 and U.S. Provisional Application No. 61/599,459 filed on Feb. 16, 2012, the contents of which are herein incorporated by reference.

FIELD OF THE INVENTION

The present invention relates to the field of lighting systems, and in particular to a remote control unit for controlling a set of lighting devices in a lighting system and methods corresponding thereto.

BACKGROUND OF THE INVENTION

The advent of integrated lighting installations, consisting of an ever growing number of individually controllable light sources, lighting devices, luminaires, lighting arrangements and the like with advanced rendering capabilities, may be regarded as transforming lighting systems for both professional and consumer markets. This brings a need for an intuitive control capable of fully exploiting the rendering capabilities of the complete lighting infrastructure. Several approaches have been proposed to control light sources, lighting devices, luminaires, lighting arrangements and the like.

Optical free space communications, i.e. visible light (VL) and infra-red (IR) communications, for the selection and advanced control of light sources has previously been proposed, and will be referred to as coded light (CL). In general, coded light has been proposed to enable advanced control of light sources. Coded light is based on embedding of data, inter alia invisible identifiers, in the light output of the light sources. Coded light may thus be defined as the embedding of data and identifiers in the light output of a visible light source, wherein the embedded data and/or identifier preferably do not influence the primary lighting function of the light source. Hence, any modulation of the emitted light pertaining to data and/or identifier should be substantially invisible to humans. This allows for applications such as interactive scene setting, commissioning and re-commissioning of networked lighting systems. Coded light may be used in communications applications wherein one or more light sources in a coded lighting system are configured to emit coded light and thereby communicate information to a receiver.

One example for controlling light sources, lighting devices, luminaires, lighting arrangements and the like involves the concept of point and control; this approach exploits the principle of coded light and a remote control unit capable of detecting the code of the light source or luminaire toward which the remote control unit is pointed and thereby to identify the light source or luminaire emitting the coded light. Such a remote control unit typically comprises one or more photodiodes for detecting the coded light emitted by the light source or luminaire. Alternatively the remote control unit may comprise a camera for detecting the coded light. One implementation of the concept of point and control involves having light sources or luminaires sending a unique coded light signal. Different light sources or luminaires send a different signal (i.e. signals with different embedded unique identifiers). One example of signals suitable for this purpose is pulse width modulation (PWM). The point and control approach shows the advantage of using coded light as a mean for a user to be able to select a luminaire by simply pointing the remote control unit towards it. As noted above this approach employs a photodiode in order to detect the coded light message of each luminaire. It has been proposed to detect and decode coded light by means of a standard camera.

European patent application EP11159149.1 relates to a system and method for detecting data embedded into the light output of illumination light detection systems. The light detection system captures light outputted from a scene in a 2D image, and temporal shifted line instances serve as light sample moments. The temporal shift between the capture of consecutive rows on the light detection means during the image capture process gives rise to a line-wise variation in pixel values for those areas in the final captured image of the scene that correspond to parts of the objects that are illuminated with said modulated light source or to the light source itself. The line-wise variation in pixel values constitute a pattern of horizontal lines superimposed on top of the image at illuminated objects. The decoding of the message, i.e. the embedded code, in the encoded light requires the recovery of a 1-dimensional (1D) signal that is associated with the original intensity variations of the modulated light source.

SUMMARY OF THE INVENTION

The inventors of the enclosed embodiments have identified a number of disadvantages with the above noted concepts. Particularly, it has been found that there is a fundamental limitation of the cameras typically embedded in portable electronic devices, such as (but not limited to) mobile communications devices (such as mobile phones, smartphones, tablet computers, and laptop computers) that renders detection not always reliable and/or reproducible. Such cameras are normally equipped with a control mechanism that automatically sets one or more parameter.

It is an object of the present invention to overcome these problems, and to provide a remote control unit and a method for controlling a set of light sources emitting coded light that are less time consuming, scalable, and flexible without being complex or error prone and which can be based on the one or more parameters of the camera.

According to a first aspect of the invention, this and other objectives are achieved by a remote control unit for controlling a set of lighting devices, comprising a processing unit arranged to determine one or more properties of signals for visible light communications, VLC, based on current settings of an image capturing unit; and a transmitter arranged to transmit a control signal pertaining to the properties to the set of lighting devices.

Advantageously this enables the remote control unit to detect modulated light from the lighting devices. Advantageously this light has been modulated according to settings of the image capturing unit, thereby allowing for optimal detection. Advantageously this allows a user of the remote control unit to manually or automatically set parameters and settings of the image capturing unit without needing to take into account properties of the light emitted by the lighting devices. Advantageously this provides for a self-controlling system in terms of transmission and detection of modulated light.

According to a first preferred embodiment the current settings relate to a current exposure time indication of the image capturing unit. According to a second preferred embodiment the current settings relate to a current exposure index rating of the image capturing unit and/or preferably the properties relate to a power level to be used by the set of lighting devices.

The first preferred embodiment may be combined with the second preferred embodiment whereby the current settings selectively relate to either a current exposure time indication or a current exposure index rating, or both a current exposure time indication and a current exposure index rating.

According to embodiments the properties relate to frequency characteristics, such as a main modulation frequency. According to embodiments the processing unit is arranged to determine the signals for visible light communications by shaping the spectrum of the signals.

According to a second aspect of the invention, the objective is achieved by a system comprising a remote control unit and at least one lighting device, wherein the remote control unit is arranged to control the lighting device, the remote control unit comprising a processing unit arranged to determine one or more properties of signals for visible light communications based on current settings of an image capturing unit; and a transmitter arranged to transmit a control signal to the set of lighting devices, the control signal pertaining to the properties; and the at least one lighting device comprising a receiver arranged to receive the control signal; a light driver arranged to generate a light emitting control signal based on the control signal, and a light emitter arranged to emit visible light communications based on the light emitting control signal.

According to a third aspect of the invention, the objective is achieved by a method for controlling a set of lighting devices, comprising determining, by a processing unit, one or more properties of signals for visible light communications based on current settings of an image capturing unit; and transmitting, by a transmitter, a control signal pertaining to the properties to the set of lighting devices. The method may be provided as a computer program product which may be stored on a computer-readable storage medium, such as a non-volatile storage medium.

According to a fourth aspect of the invention, there is provided a lighting device comprising a light emitter and a light driver. The light emitter is arranged to emit a visible light output being modulated, at a main modulation frequency, to embed data into the light output for detection by an image capturing unit. The light driver is arranged to adapt the modulation frequency so as not to correspond to blind spots produced by an acquisition process of the image capturing unit.

For example in embodiments, the light driver may be arranged to adapt the modulation frequency so as not to correspond to blind spots that are due to a low pass filtering effect produced by the acquisition process of the image capturing unit. In embodiments, the light driver may be arranged to adapt the modulation frequency so as not to correspond to blind spots produced by an exposure time or exposure index rating of the acquisition process. In embodiments the light driver may be arranged to perform said adapting by adapting the modulation frequency so as not to be a multiple of $1/T_{exp}$ where $T_{exp}$ is an exposure time of the acquisition process. In embodiments, the image capturing unit may have a rolling shutter camera, and the light driver may be arranged to adapt the modulation frequency so as not to correspond to blind spots produced by the acquisition process of the rolling shutter camera. In embodiments, the exposure time or exposure index rating is that of the rolling shutter camera.

Optionally, in embodiments the lighting device may comprise a receiver arranged to receive a control signal from a remote control unit, and the light driver may be arranged to perform said adapting of the modulation frequency based on said control signal. In embodiments, the control signal may be based on a setting of image capturing unit, provided by an exposure time indication or an exposure index rating of the acquisition process of the image capturing unit.

It is noted that the invention relates to all possible combinations of features recited in the claims. Likewise, the advantages of the first aspect apply to the second aspect as well as the third aspect, and vice versa.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout.

Recent development, such as exemplified by European patent application EP11159149.1, has shown the possibility to detect coded light with the use of standard cameras. Operation of a lighting system will now be disclosed with reference to the lighting system 1 of FIG. 1 and the flowchart of FIG. 10. The lighting system 1 of FIG. 1 comprises at least one lighting device arranged to emit coded light, schematically denoted by lighting devices with reference numerals 2a, 2b, 2c. The at least one lighting device 2a, 2b, 2c may be a luminaire and/or be part of a lighting control system. The lighting system 1 may thus be denoted as a coded lighting system. As will be further disclosed with reference to FIG. 2 the lighting device 2a, 2b, 2c comprises a receiver, a light driver, and a light emitter. A luminaire may comprise at least one such lighting device 2a, 2b, 2c. The term "lighting device" means a device that is used for providing light in a room, for purpose of illuminating objects in the room. A room is in this context typically an apartment room or an office room, a gym hall, an indoor retail, environment, a theatre scene, a room in a public place or a part of an outdoor environment, such as a part of a street. Each lighting device 2a, 2b, 2c is capable of emitting coded light, as schematically illustrated by arrows 3a, 3b, 3c. The emitted light thus comprises a modulated part associated with coded light comprising information sequences. The emitted light may also comprise an un-modulated part associated with an illumination contribution. Each lighting device 2a, 2b, 2c may be associated with a number of light (or lighting) settings, inter alia pertaining to the illumination contribution of the lighting device, such as colour, colour temperature, intensity and frequency of the emitted light. In general terms the illumination contribution of the lighting device may be defined as a time-averaged output of the light emitted by the lighting device 2a, 2b, 2c.

Figure 1:
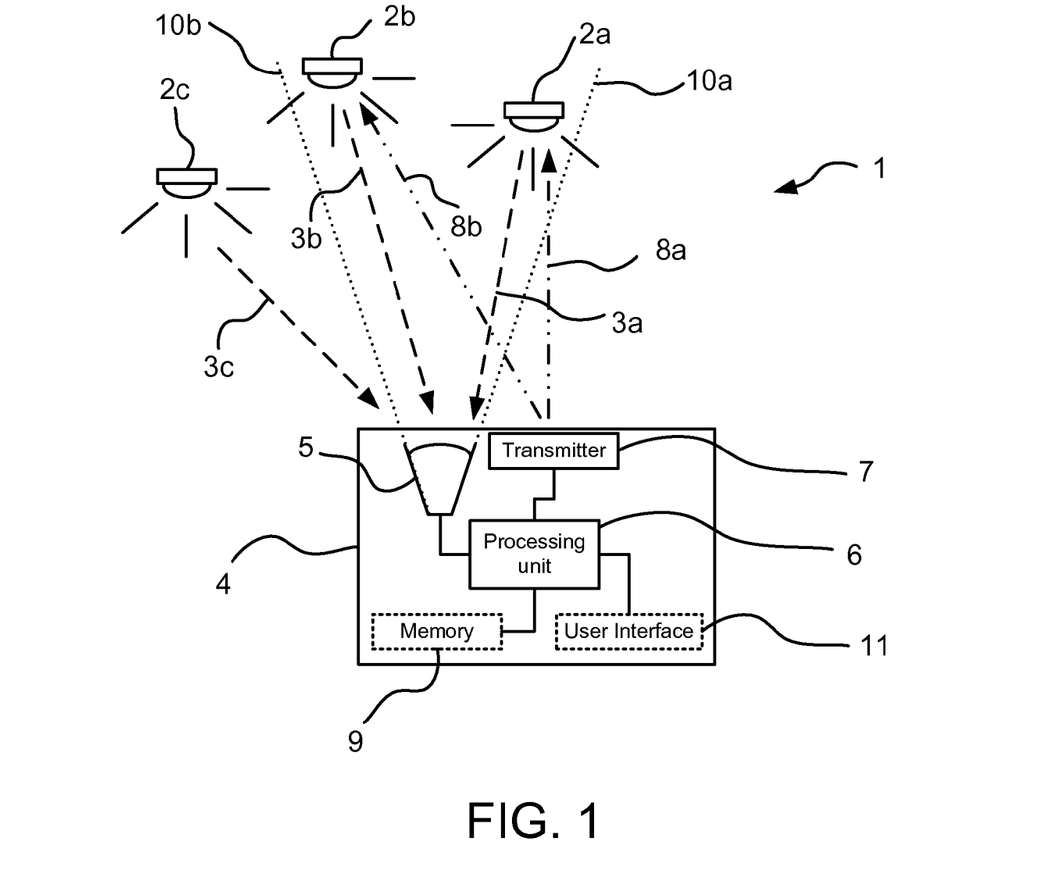
FIG. 1 illustrates a lighting system according to embodiments.

The system 1 further comprises a device termed a remote control unit 4 arranged to receive and detect the coded light emitted by the lighting devices 2a, 2b, 2c in the system 1. The remote control unit 4 will be described in terms of a number of functional blocks. The remote control unit 4 comprises an image capturing unit 5 having an image sensor for detecting the light emitted by the lighting device(s) 2a, 2b, 2c in the system 1 by capturing images comprising coded light. The image capturing unit 5 may be embodied as (part of) a camera. The remote control unit 4 further comprises a processing unit 6 operatively coupled to the image capturing unit 5. The processing unit 6 analyzes images captured by the image capturing unit 5 and from the captured images identifies coded light as transmitted by the lighting device 2a, 2b, 2c. The remote control unit 4 further comprises a transmitter 7 operatively coupled to the processing unit 6. The transmitter 7 is arranged to transmit data, as schematically illustrated by arrows 8a, 8b to one or more of the lighting devices 2a, 2b, 2c in the system 1. The remote control unit 4 may be part of a mobile communications device (such as a mobile phone, a smartphone, a tablet computer, or a laptop computer) and the herein disclosed functionality may at least partly be provided as one or more applications, so-called "Apps". The one or more applications may be stored as one or more software products defining a computer program product and stored on a computer-readable storage medium.

Further functionality and properties of the remote control unit 4 will be described next with further references to FIG. 1. The remote control unit 4 comprises an image capturing unit 5 for receiving coded light from at least one lighting device, such as the lighting devices 2a, 2b, 2c in the lighting system 1. In order for the image capturing unit 5 to receive light with a given illumination contribution at a given exposure the image capturing unit 5 is associated with a number of settings and parameters.

Figure 3:
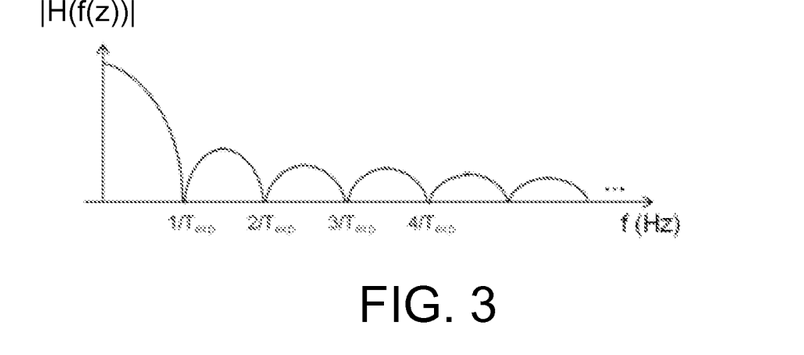
FIG. 3 schematically illustrates low-pass filter characteristics of an image capturing unit.

The image capturing unit 5 may be arranged to capture images at one of a plurality of different exposure times, or shutter speeds. The current exposure time of the image capturing unit 5 may be provided by an exposure time indication. The image capturing unit 5 may thus be able to receive and detect light, particularly coded light, at one or more of the plurality of different exposure times. With a fixed exposure time $T_{exp}$ the acquisition process of the image capturing unit 5 produces a low pass filtering effect on the acquired light signal whereby the cut-off frequency (in Hertz) of the low pass filter is determined by the shutter speed value $T_{exp}$ (in seconds). FIG. 3 schematically illustrates the low-pass filter characteristic $|H(f(z))|$ being the absolute value of the Fourier transform of the frequency representation of the acquisition process of an image capturing unit 5 having a rolling shutter camera with an exposure time $T_{exp}$.

The image capturing unit 5 may further be arranged to capture images at one of a plurality of different exposure index ratings, or ISO values. The image capturing unit 5 may thus be able to receive and detect light, particularly coded light, at one or more of the plurality of different exposure index ratings.

The image capturing unit 5 may further be arranged to capture images within a field of view 10a-10b along a general light detection direction. The image capturing unit 5 is thus able to receive and detect light, particularly coded light, within the field of view 10a-10b. The general light detection direction can be changed by changing the direction of the image capturing unit 5. The field of view 10a-10b may be narrowed by the remote control unit 4 performing a zoom-in operation. Similarly, the field of view 10a-10b may be widened by the remote control unit 4 performing a zoom-out operation. Thereby the image capturing unit 5 is enabled to capture images in a plurality of different directions and with a plurality of different fields of view.

Other parameters and settings of the image capturing unit 5 may comprise noise reduction, white balance, contrast, gamma value, focus point, and resolution (in video/image mode, which often may affect line rate and maximum frame rate).

According to embodiments, one or more of the parameters and settings of the image capturing unit 5, for example the exposure time or the exposure index rating is/are frozen just before the detection takes place (i.e. before the one or more images are captured). In general, the parameters and settings are set on the basis of the current illumination conditions. Additionally, in order to have a reliable detection of coded light, it is necessary that the signals used by the lighting devices 2a, 2b, 2c for visible light communications, for example, are not a multiple of the exposure time, else the image capturing unit 5 is "blind" to it. Further, given that the exposure time is automatically set (inter alia depending on the illumination conditions) or manually set every time a new image is to be captured, it can happen that the exposure time becomes a multiple of the time period of the signals sent by the lighting devices 2a, 2b, 2c. Information regarding the parameters and settings of the image capturing unit 5 is therefore communicated to the processing unit 6.

In the typical scenario of FIG. 1, the image capturing unit 5 of the remote control unit 4 detects the light emitted by the one or more lighting devices 2a-2c (the light being within the field of view 10a-10b of the image capturing unit 5). The settings of the image capturing unit 5 may thereby be utilized by the remote control unit 4 so that visible light communications received by the image capturing unit 5 can be adapted to the settings.

Figure 10:
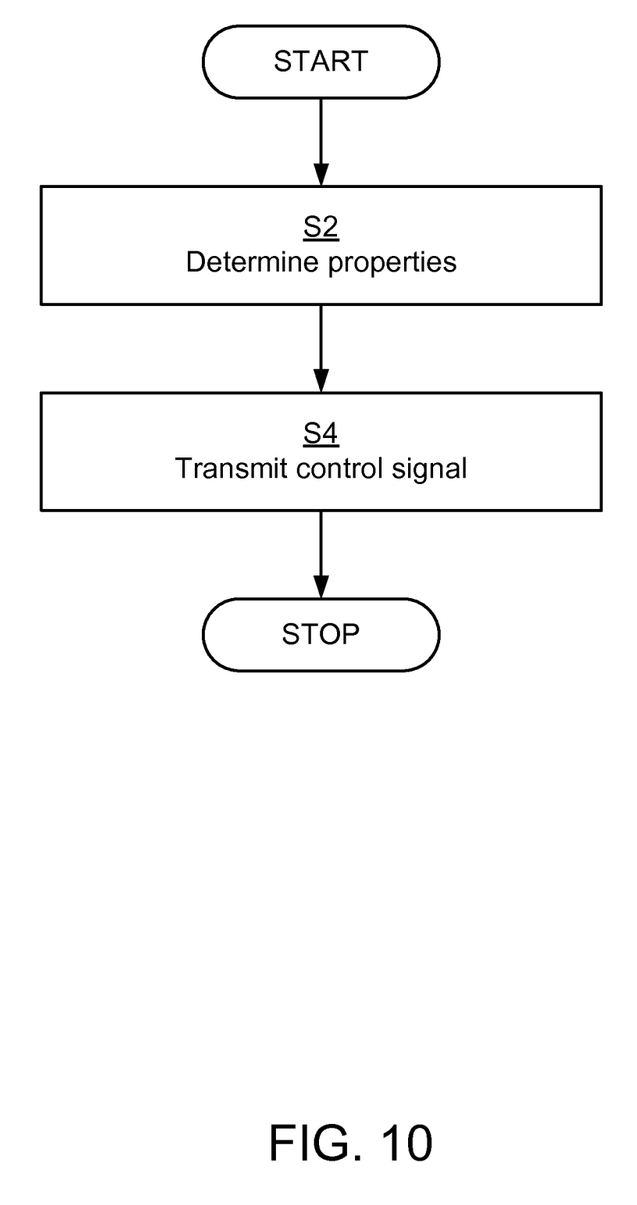
FIG. 10 is a flowchart of a method according to embodiments.

As noted above, the remote control unit 4 further comprises a processing unit 6. The processing unit 6 may be implemented by a so-called central processing unit (CPU). In a step S2 the processing unit 6 determines one or more properties of the signals for visible light communications (VLC) to be used by the one or more lighting devices 2a, 2b, 2c based on the current settings of the image capturing unit 5. The one or more properties are thus based on one or more of the current exposure time, exposure index rating, noise reduction, white balance, contrast, gamma value, focus point, and resolution of the image capturing unit 5. The one or more properties are determined such that the signals for visible light communications may be detected by the image capturing unit 5.

According to an embodiment the current settings thus relate a current exposure index rating of the image capturing unit 5. In this case the properties preferably relate to a power level to be used by the set of lighting devices 2a, 2b, 2c during visible light communications.

Figure 4:
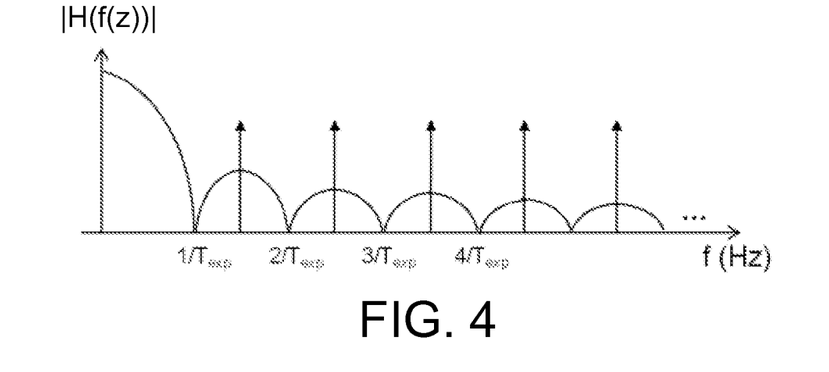
FIGS. 4 and 5 illustrate examples of possible signal allocations.
Figure 5:
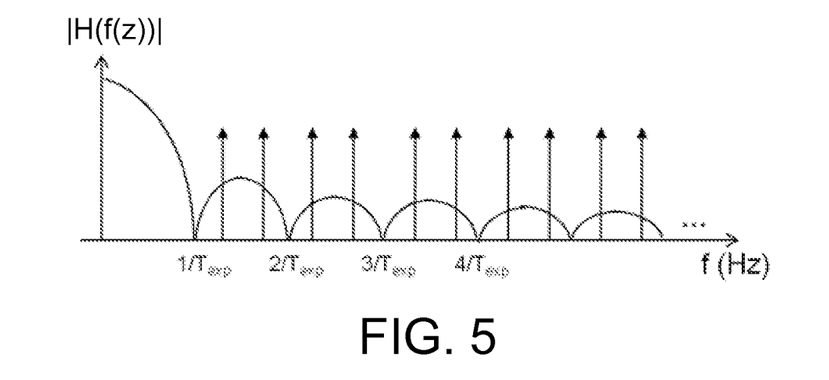

According to an embodiment the current settings thus relate to a current exposure time indication of the image capturing unit 5. In this case the signals for visible light communications are thus based on the current exposure time of the image capturing unit 5. Properties of the signals for visible light communications are preferably determined such that the main frequency characteristics of the signals for visible light communications do not correspond to the blind spots (i.e. the zero crossings) of the frequency representation of the current exposure time of the image capturing unit 5 (due to the low-pass filter effect as disclosed above). FIGS. 4 and 5 illustrate examples of possible signal allocations as spikes "↑" along with the low-pass filter characteristic $|H(f(z))|$ of the acquisition process of the image capturing unit 5 having a rolling shutter camera with an exposure time $T_{exp}$.

Particularly, the processing unit 6 may be arranged to determine the main frequency to be inside the main lobe or a side lobe of a frequency representation of the exposure time indication. In a case the main frequency is determined to be inside a side lobe, the frequency is preferably a midpoint of the side lobe (as in FIG. 4). This would maximize the distance of the frequency to the zero crossings of the low-pass-filter. This would also minimize the attenuation due to the low pass filter. Also in a case the main frequency characteristics is determined to be inside a side lobe the side lobe is preferably the first side lobe (i.e. the side lobe neighboring the main lobe). In any case, the frequency characteristics are generally determined to be within a predetermined frequency range, thereby restricting the bandwidth of the signals for visible light communications. Restricting the lower end point of the bandwidth of the signals for visible light communications to be higher than a certain frequency may be beneficial in order to avoid flicker in the visible light. Restricting the upper end point of the bandwidth of the signals for visible light communications to be lower than a certain frequency may be beneficial in order to keep the signals away from regions in the frequency representation where the low-pass filter attenuation is too severe for practical situations.

Additionally or alternatively the signals for visible light communications may be based on coding techniques whereby the waveform representing the signal is modulated according to a digital information sequence. Preferably each individual lighting device 2a, 2b, 2c is associated with its own unique information sequence. The unique information sequence may thus represent a lighting device identification code. The identification code may be realized as a pulse width modulation code. As a second example the identification code may be realized by using code division multiple access techniques. It is to be understood that other embodiments for the realization of identification codes are known to a person skilled in the art.

The resulting spectrum of the modulated sequence of waveforms can be derived from the basic waveform function and the characteristics of the digital information sequence. As a non-limiting example, the power spectrum of a modulated waveforms based on linear pulse amplitude modulation may be regarded as the multiplication of the power spectrum of the discrete digital information sequence and the absolute square of the Fourier spectrum of the basic pulse function. Henceforth, through encoding mechanisms, digital information sequences with different spectral characteristics may be applied in order to shape the spectrum of the basic pulse function into certain desirable shapes. The encoding mechanisms may therefore be referred to as spectrum shaping codes. A desirable signal spectrum may be based on any one of the above disclosed parameters and settings of the image capturing unit 5. Coding techniques may then be applied to shape the modulated signal waveform into the desirable spectrum.

Figure 6:
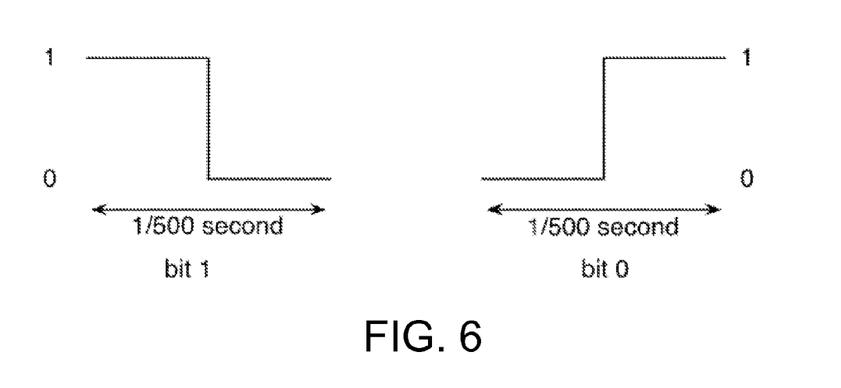
FIG. 6 illustrates a basic modulation waveform.
Figure 7:
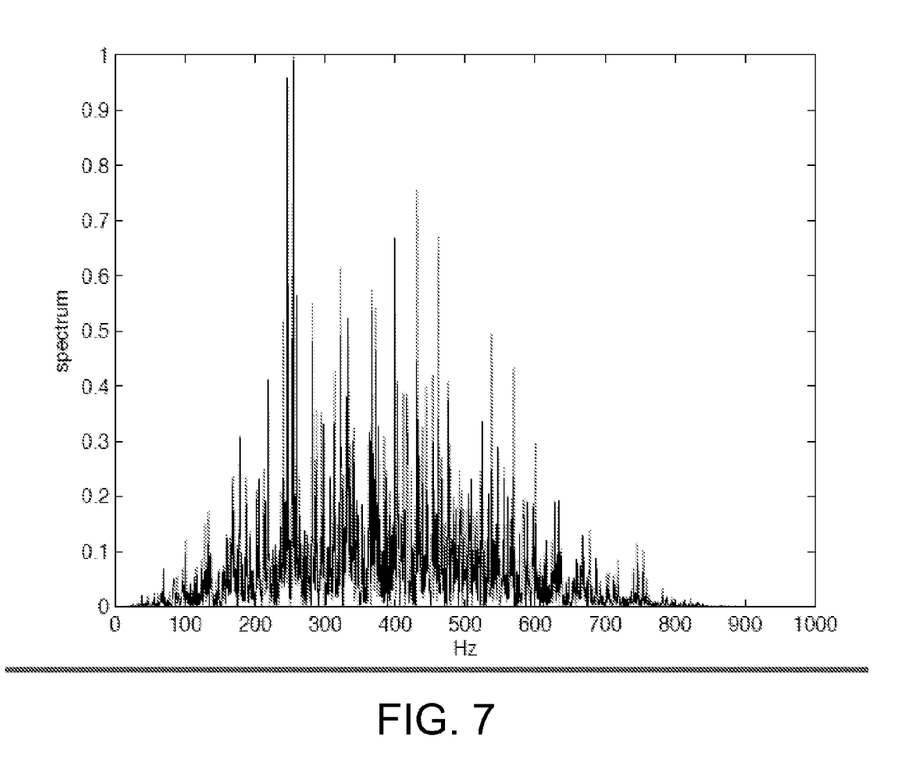
FIG. 7 illustrates the spectrum from an un-coded random sequence.
Figure 8:
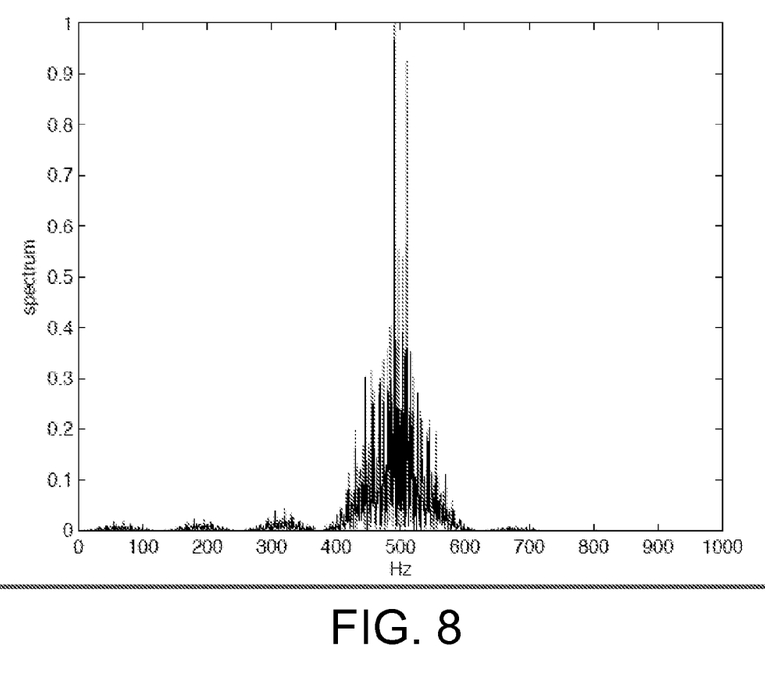
FIG. 8 illustrates the spectrum of a repetition code with length 4.

A number of non-limiting examples of spectrum shaping codes will be presented next. The spectra presented here are numerically computed based on a 500 Hz on-off sequence within a 1 second time interval. The basic modulation waveform is illustrated in FIG. 6. The spectrum from a random sequence without any spectrum shaping code is schematically illustrated in FIG. 7. As a first example, a repetition code with length 4 is applied as an example of a spectrum shaping code, i.e. the source information bit 1 is mapped to the channel code sequence 1111, and the source information bit 0 is mapped to the channel code sequence 0000. The spectrum of the modulated waveform is schematically illustrated in FIG. 8. As a second example, a repetition code with length 10 is applied as the spectrum shaping code, i.e. bit 1 is now 1111111111 and bit 0 is now 0000000000. The spectrum is schematically illustrated in FIG. 9.

Figure 9:
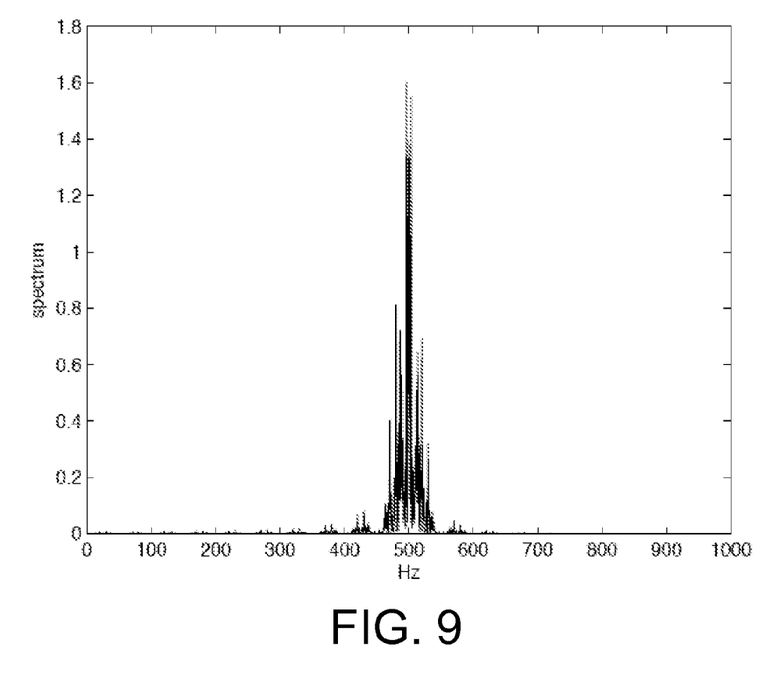
FIG. 9 illustrates the spectrum of a repetition code with length 10.

As can be seen from FIGS. 7, 8 and 9, the spectrum with spectrum shaping code is much more narrow than that without the spectrum shaping code. Moreover, the spectrum of the repetition code of length 10 is more narrow than that with repetition code of length 4. Additionally, as a cost for the more narrow spectrum, the achievable data rate with repetition code length 10 is generally lower than that with repetition code length 4.

The appropriate center frequency and the appropriate length for the repetition code may be dictated by practical circumstances and conditions of the lighting system 1 under consideration. In practice the width of the signal spectrum may be tuned to generate the signal with a spectrum suitable for the current values of the parameters and settings of the image capturing unit, thereby enabling detection of the coded light.

In general, the criteria for selecting the signals may depend on the number of lighting devices in the set of lighting devices 2a, 2b, 2c (hence number of required signals), on the channel condition (e.g. the distance and/or illumination conditions between the lighting devices 2a, 2b, 2c and the remote control unit), etc. Particularly, in case the lighting system 1 comprises of a plurality of lighting devices 2a, 2b, 2c, the signals are preferably chosen such that the signals are maximally spaced (in frequency sense) in relation to each other to reduce the risk of cross-talk.

The determined set of signals for the given parameters and settings are then communicated to the lighting devices 2a, 2b, 2c. As noted above the remote control unit 4 further comprises a transmitter 7. The transmitter 7 may be a light transmitter configured to emit coded light. Alternatively the transmitter 7 may be a radio transmitter configured to wirelessly transmit information. The transmitter 7 may be configured for bidirectional communications. The transmitter 7 may comprise a radio antenna. Alternatively the transmitter 7 may comprise a connector for wired communications. In a step S4 the transmitter 7 thus transmits a control signal pertaining to the determined properties of the signals for visible light communications to the set of lighting devices 2a, 2b, 2c.

Figure 2:
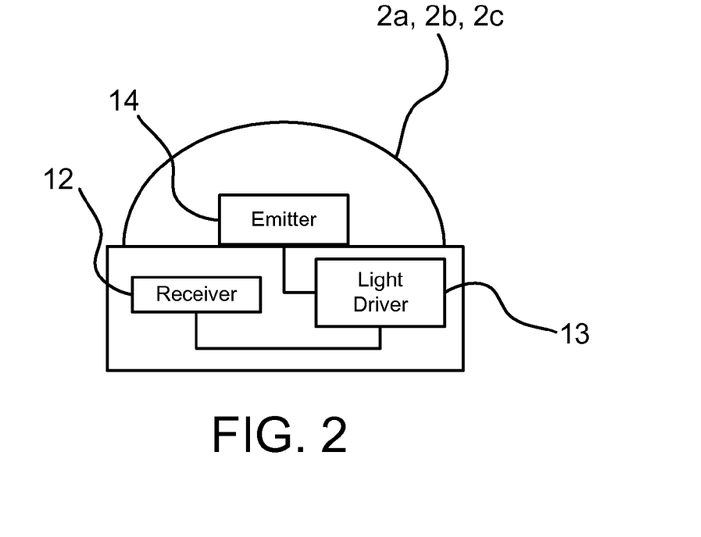
FIG. 2 illustrates a lighting device according to embodiments.

FIG. 2 illustrates a lighting device 2a, 2b, 2c according to embodiments. The receiver 12 is arranged to receive the control signal as generated by the remote control unit 4. Once a lighting device 2a, 2b, 2c has received the control signal the lighting device 2a, 2b, 2c may produce output light using the assigned signal. The lighting device 2a, 2b, 2c therefore comprises a light driver 13 which is arranged to generate a light emitting control signal based on the control signal. The light emitter 14 of the lighting device 2a, 2b, 2c may then emit visible light communications signals based on the light emitting control signal. The processing unit 6 of the remote control unit 4 is therefore preferably arranged to fix the settings and parameters of the image capturing unit 5 in accordance with the properties enclosed in the control signal transmitted to the lighting devices 2a, 2b, 2c. For example, the processing unit 6 may fix the exposure time and/or exposure index rating of the image capturing unit 5 based on the exposure time indication and/or the exposure index rating. The image capturing unit 5 may then receive VLC signals having the one or more properties from at least one of the set of lighting devices 2a, 2b, 2c at the fixed exposure time and/or exposure index rating.

The remote control unit 4 may thereby be arranged to identify an individual lighting device 2a, 2b, 2c from the set of lighting devices 2a, 2b, 2c. The individual lighting device 2a-2c are preferably identified by lighting device identification codes, which, as discussed above, may be embedded in the emitted light contributions of the lighting device 2a, 2b, 2c.

The remote control unit 4 may further comprise a user interface 11 through which a user is enabled to interact with the functionality of the remote control unit 4. Thus the user interface 11 may in particular be arranged to receive user input and to provide information to the user. The user input may receive tactile user input for example from a keyboard or a joystick provided on, or being operatively coupled to, the remote control unit 4. As the skilled person understands, there may be other equally likely and equivalent ways of receiving user input.

The remote control unit 4 may further comprise other components, such as a memory 9 operatively coupled to the processing unit 6. The memory 9 is operated according to principles which as such are known by the skilled person. Particularly, the memory 9 may comprise a set of control signals pertaining to the properties of the signals for visible light communications to be transmitted to the set of lighting devices 2a, 2b, 2c.

The person skilled in the art realizes that the present invention by no means is limited to the preferred embodiments described above. On the contrary, many modifications and variations are possible within the scope of the appended claims. Particularly, the disclosed remote control unit 4 and at least one luminaire comprising at least one lighting device 2a, 2b, 2c and being controllable by the remote control unit 4 may be provided as an arrangement. Further, according to one aspect the invention is not limited to control of the lighting device by a remote control. It will be appreciated by a person skilled in the art given the disclosure herein that any adaptation of the modulation frequency could also potentially avoid blind spots, e.g. by varying the frequency autonomously at the lighting device. Further, the blind spots are not limited to those due to a rolling shutter acquisition process. It will be appreciated given the present disclosure that the adapting of the modulation can be used to avoid any frequency blind spot that may exist in the image capturing unit, e.g. due to some other side effect or limitation of the acquisition process such as some other filtering effect.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A remote control unit for controlling a set of lighting devices, comprising:
    a processing unit arranged to determine one or more properties of signals for visible light communications, based on current settings of an image capturing unit, wherein said current settings relate to a current exposure time indication of said image capturing unit; and
    a transmitter arranged to transmit a control signal pertaining to said properties to said set of lighting devices,
    wherein said properties relate to main frequency characteristics of said signals, and wherein said processing unit is arranged to determine said main frequency characteristics to be inside the main lobe or a side lobe of a frequency representation of said exposure time indication.

2. The remote control unit according to claim 1, wherein said current settings relate to a current exposure index rating of said image capturing unit and wherein said properties relate to a power level to be used by said set of lighting devices.

3. The remote control unit according to claim 2 wherein:
    said image capturing unit is capable of, at a plurality of settings, capturing images, the current settings being chosen from said plurality of settings.

4. The remote control unit according to claim 3, wherein said processing unit is arranged to fix the exposure time and/or exposure index rating of said image capturing unit based on said exposure time indication and/or exposure index rating, and
    wherein said image capturing unit is arranged to receive visible light communications signals having said one or more properties from at least one of said set of lighting devices at said fixed exposure time and/or exposure index rating.

5. The remote control unit according to claim 1, wherein said properties relate to frequency characteristics of the signals for visible light communications emitted by said set of lighting devices.

6. The remote control unit according to claim 1, wherein said processing unit is arranged to determine said frequency characteristics to be a midpoint of said side lobe.

7. The remote control unit according to claim 1, wherein said side lobe is the first side lobe of said frequency representation.

8. The remote control unit according to claim 1, wherein said processing unit is arranged to determine said frequency characteristics to be within a predetermined frequency range.

9. The remote control unit according to claim 1, wherein said processing unit is arranged to determine said signals for visible light communications, to employ one of amplitude modulation, frequency modulation, and phase modulation.

10. The remote control unit according to claim 1, wherein said processing unit is arranged to determine said signals for visible light communications by shaping the spectrum of said signals.

11. The remote control unit according to claim 1, wherein said signals for visible light communications are based on pulse width modulation.

12. The remote control unit according to claim 1, wherein said current settings identify a subset of signals from a set of predetermined signals.

13. The lighting device of claim 1, wherein the image capturing unit has a rolling shutter camera, and wherein the light driver is arranged to adapt the modulation frequency so as not to correspond to blind spots produced by the acquisition process of the rolling shutter camera.

14. A system comprising a remote control unit and at least one lighting device, wherein the remote control unit is arranged to control said lighting device,
    the remote control unit comprising:
    a processing unit arranged to determine one or more properties of signals for visible light communications, based on current settings of an image capturing unit, wherein said current settings relate to a current exposure time indication of said image capturing unit; and a transmitter arranged to transmit a control signal pertaining to said properties to a set of lighting devices, wherein said properties relate to main frequency characteristics of said signals, and wherein said processing unit is arranged to determine said main frequency characteristics to be inside the main lobe or a side lobe of a frequency representation of said exposure time indication; and the at least one lighting device comprising:

a receiver arranged to receive said control signal;

a light driver arranged to generate a light emitting control signal based on said control signal, and a light emitter arranged to emit visible light communications based on said light emitting control signal.

15. A method for controlling a set of lighting devices, comprising:

determining, by a processing unit, one or more properties of signals for visible light communications, based on current settings of an image capturing unit, wherein said current settings relate to a current exposure time indication of said image capturing unit; and transmitting, by a transmitter, a control signal pertaining to said properties to said set of lighting devices, wherein said properties relate to main frequency characteristics of said signals, and wherein said processing unit is arranged to determine said main frequency characteristics to be inside the main lobe or a side lobe of a frequency representation of said exposure time indication.

16. A lighting device, comprising:

a light emitter arranged to emit a visible light output being modulated, at a main modulation frequency, to embed data into the light output for detection by an image capturing unit; and a light driver arranged to adapt the modulation frequency so as not to correspond to blind spots produced by an acquisition process of the image capturing unit, wherein the light driver is arranged to perform said adapting by adapting the modulation frequency so as not to be a multiple of $1/T_{exp}$ where $T_{exp}$ is an exposure time of the acquisition process.

17. The lighting device of claim 16, wherein the light driver is arranged to adapt the modulation frequency so as not to correspond to blind spots that are due to a low pass filtering effect produced by the acquisition process of the image capturing unit.

18. The lighting device of claim 16, wherein the light driver is arranged to adapt the modulation frequency so as not to correspond to blind spots produced by an exposure time or exposure index rating of the acquisition process.

19. The lighting device of claim 18, wherein the image capturing unit has a rolling shutter camera, and the exposure time or exposure index rating is of the rolling shutter camera.

20. The lighting device of claim 19, wherein the control signal is based on a setting of the image capturing unit, provided by an exposure time indication or an exposure index rating of the acquisition process of the image capturing unit.

21. The lighting device of claim 16, comprising a receiver arranged to receive a control signal from a remote control unit, wherein the light driver is arranged to perform said adapting of the modulation frequency based on said control signal.

* * * * *